Feb. 12, 1929.

J H. LAKIN 1,701,977

WATER COOLER

Filed Feb. 25, 1927    3 Sheets-Sheet 1

Inventor
J Harry Lakin
by C. M. Clarke
Attorney

Feb. 12, 1929.
J. H. LAKIN
1,701,977
WATER COOLER
Filed Feb. 25, 1927    3 Sheets-Sheet 2
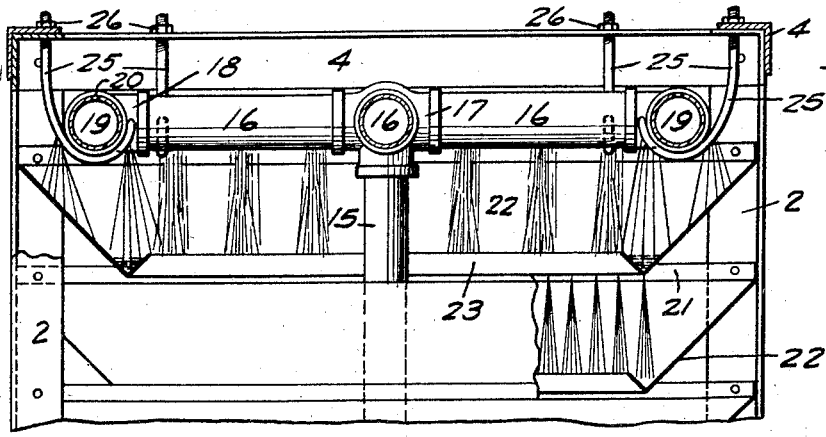
Fig. 2.
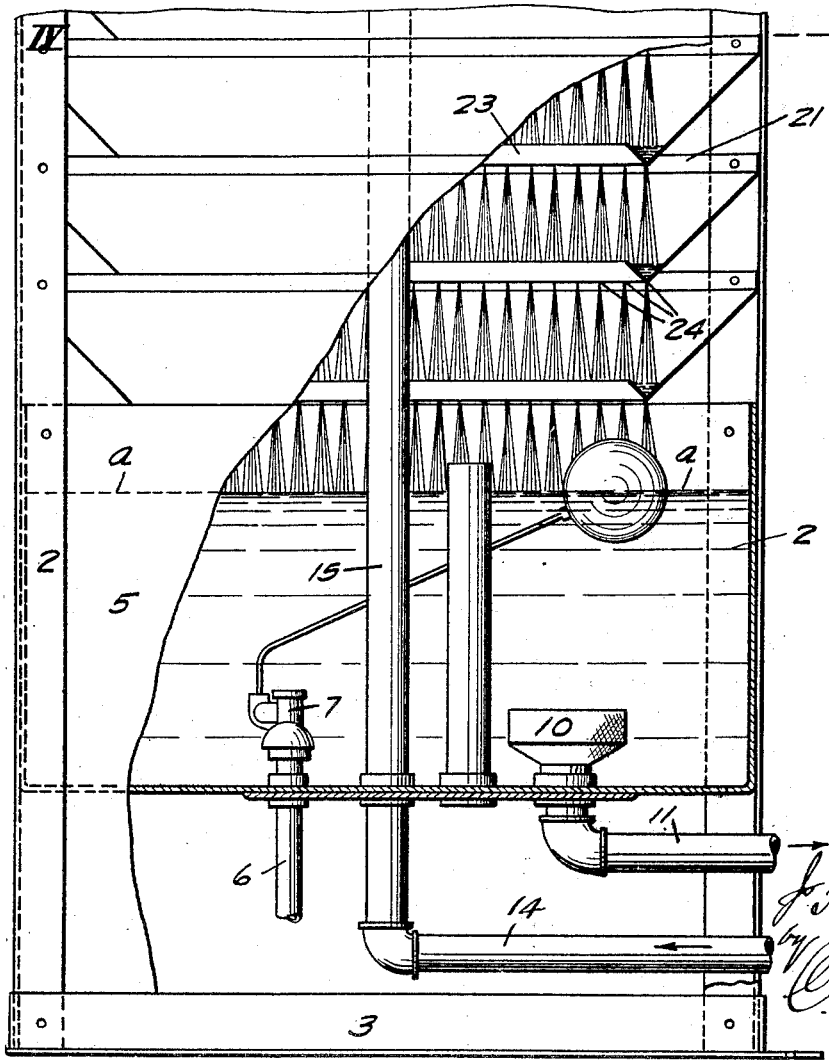

Feb. 12, 1929.
J H. LAKIN
WATER COOLER
Filed Feb. 25, 1927      3 Sheets-Sheet 3
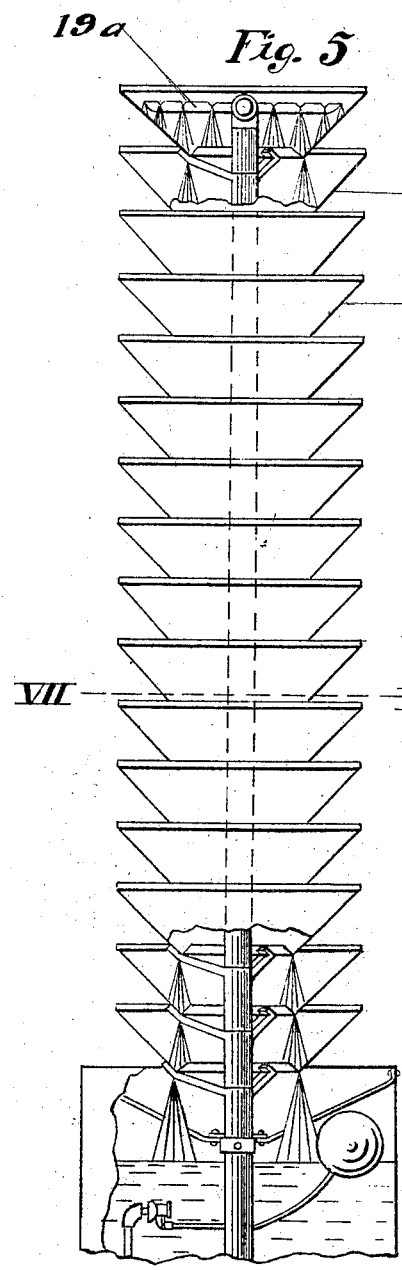
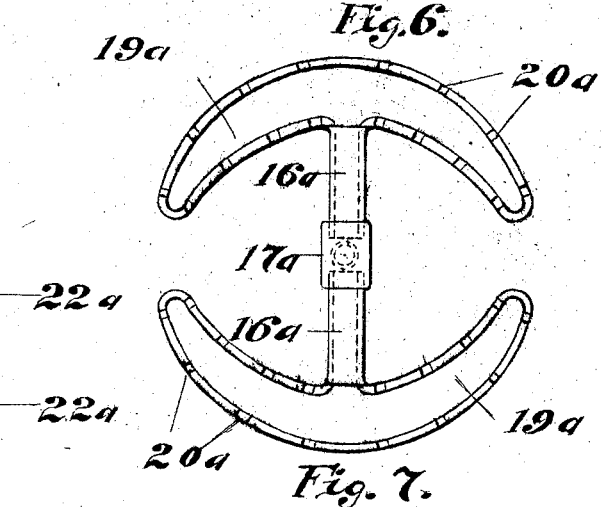
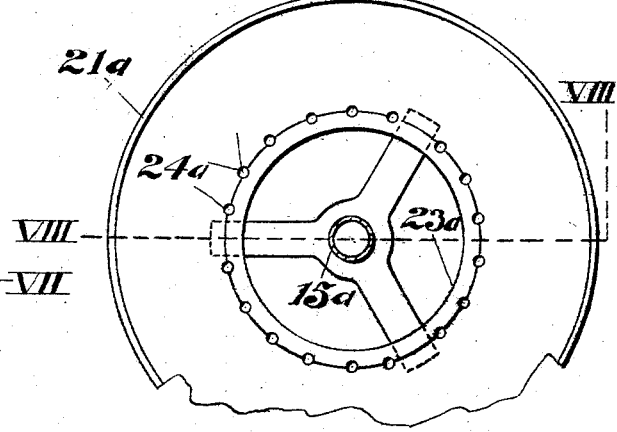
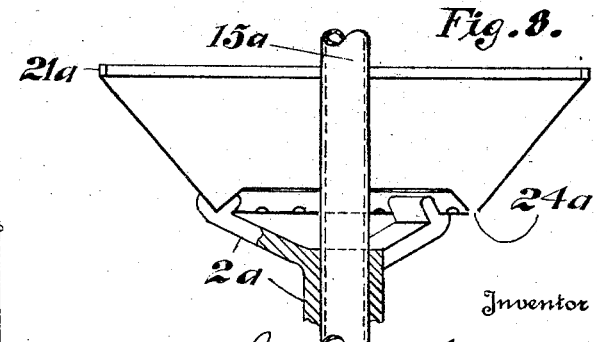

Patented Feb. 12, 1929.

1,701,977

UNITED STATES PATENT OFFICE.

J HARRY LAKIN, OF PITTSBURGH, PENNSYLVANIA, ASSIGNOR TO LAKIN MANUFACTURING COMPANY, INC., OF PITTSBURGH, PENNSYLVANIA, A CORPORATION OF DELAWARE.

WATER COOLER.

Application filed February 25, 1927. Serial No. 170,801.

My invention relates to improvements in apparatus for re-cooling water, by exposure to and intermingling contact with the atmosphere. The cooling apparatus is particularly designed for use in connection with condensers of refrigerating plants, or for similar purposes, whereby the condensing water surrounding a heat absorbing coil within an enclosing tank may be quickly and effectively re-cooled for continuous re-use.

In condensing apparatus of this class, large amounts of water are ordinarily used with more or less waste and resulting expense. One of the objects of the present invention is to avoid such waste by the continuous circulation and re-use of a main body of water, subjected to atmospheric cooling action, with means for collection, for circulation, and return to the uppermost portion of a distributing header, and subsequent cooling by the means herein provided.

Such means, which comprise the subject matter of the present invention, have for their purpose to effect frequent spraying and exposure to the atmosphere through and by means of a series of separated collecting spray pans, with intervening clearance for ample air circulation and contact, so constructed and arranged as to prevent the wasteful action of cross currents of air.

The invention also involves various detail features of construction and operation as shall be more fully hereinafter described.

In the accompanying drawings, showing one preferred embodiment of the invention:

Fig. 2 is a view in elevation, partly in section, of a water distributing and cooling tower embodying the invention;

Fig. 5 is a view similar to Fig. 2, showing a modified construction;

Fig. 6 is a plan view of the upper water distributing troughs;

Fig. 7 is a cross-section on the line VII—VII of Fig. 5;

Fig. 8 is a vertical section on the line VIII—VIII of Fig. 7.

Figure 1:
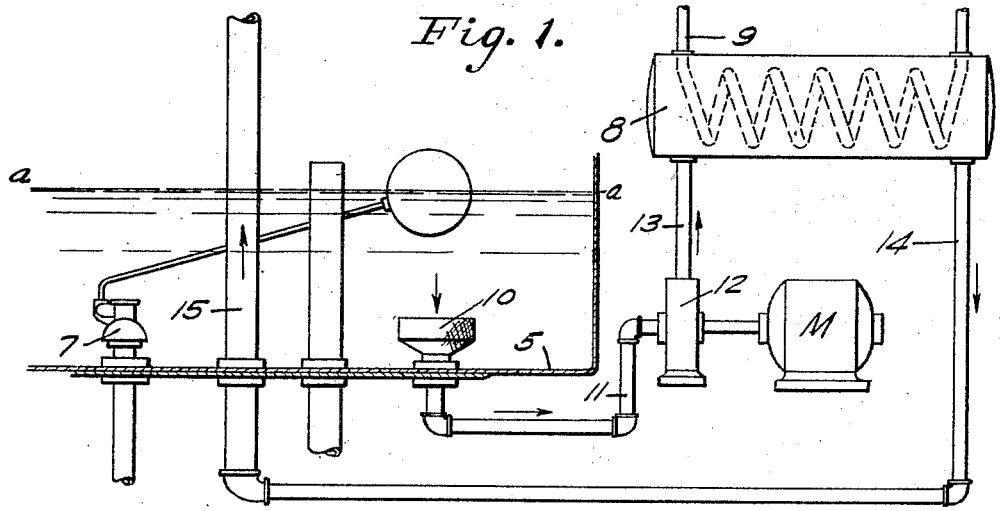
Fig. 1 is a somewhat diagrammatic view, showing the circulating system in connection with a condenser.
Figure 3:
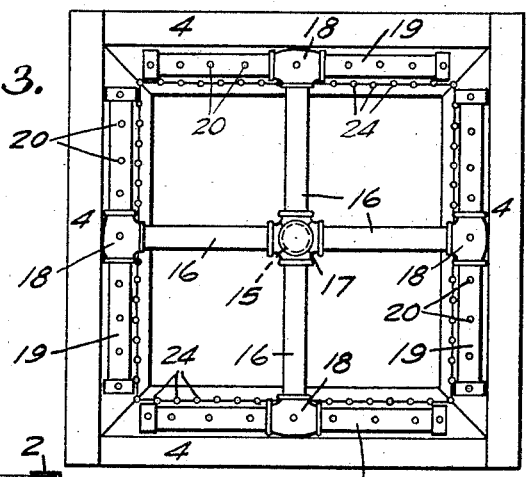
Fig. 3 is a plan view of its upper end.

In the drawings, 2 is the skeleton supporting framework for the apparatus preferably constructed of structural steel members, as angles, and having a supporting base 3 mounted upon any suitable supporting foundation. The corner angle members extend upwardly throughout the whole length of the tower as shown, and are connected at the top with similar corner members 4 laid over and suitably connected by rivets or bolts in the usual manner of such construction.

In the lower or base portion of the tower is a tank or basin 5, adapted to contain a body of water at or about the normal level $a, a$. Water is initially supplied thereto for such purpose, and also for supplementing any exhaust loss thereof by means of a supply pipe 6 connected with a pressure main, opening into the interior through a float-controlled valve 7 whereby to replenish the supply below the normal line $a, a$, and to shut it off when such level is reached.

Tank 5 is for holding and collecting the cooling water for supply to the condenser tank 8 through which passes the circulating condensing coil 9 of any refrigerating system, the cooling water being circulated about such coil in the well known manner for condensing anhydrous-ammonia content therein in gaseous form.

Water for such cooling purpose is taken directly from the lower portion of tank 5 through a suitable screen 10 by suction pipe 11 leading to a pump 12, operated by motor M, which supplies such water to one end of the tank 8 by pipe 13.

Under pressure of the pump within closed tank 8 a corresponding amount of water is returned by pipe 14 to the lower end of stand pipe 15, by which it is carried to the top of the tower for distribution to the upper end of the spray pan system. At such upper end pipe 15 is branched, as by laterally extending pipes 16, connected with the stand pipe 15 by a suitable fitting 17. At their outer ends pipes 16 are connected by T-couplings 18 with cross distributing terminal pipes 19, having a longitudinal series of comparatively small spray ports 20.

Immediately below the said spray pipes, is the uppermost spray pan of a vertical series, all of which are of the same construction and made of comparatively light sheet metal.

Figure 4:
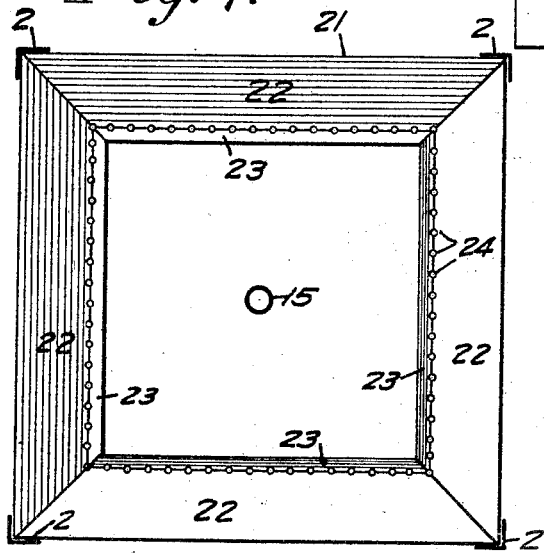
Fig. 4 is a cross section on the line IV—IV of Fig. 2.

Each such spray pan is of rectangular shape, as in Fig. 4, and in interfitting connection with the corner angle posts 2 to which the upper edges 21 of each pan are secured by rivets or bolts. Such upper edge is comparatively shallow, extending vertically around the four sides of the pan, and merges into the inwardly sloping bottom 22.

Such bottom extends inwardly and downwardly at an angle of approximately 45°, and is then turned upwardly and inwardly for a short distance, providing the inner water retaining ledge 23, the inner edges of which form the inner boundary line of each pan, and are in register with each other vertically throughout the series around the interior rectangular hollow space.

At the angle joint between the converging walls 22 and 23, and forming the bottom center of a continuous trough so formed, I provide a series of closely adjacent comparatively small perforations 24, in rows and also in approximate registering relation vertically throughout the series. The distributing ports 20 of pipes 19 are preferably arranged about midway of the main outer sloping walls 22, so that the water delivered thereby will fall upon such walls and inwardly thereover to the outlet ports.

For the purpose of supporting the pipe terminals 19, and of accurately adjusting them to proper level for equal distribution of water, each of said pipes is connected with the top rim portion 4 by a pair of supporting hooks 25, engaging underneath the pipe and extending upwardly through the top flange of the corner angle framing and having a terminal nut 26 as shown.

By such arrangement the upper portion of the distribution header, which is otherwise free to move laterally, may be accurately tilted and adjusted to a limited extent by properly tightening or loosening the several bolts forming the hooks.

The construction and operation of the invention will be readily understood and appreciated from the foregoing description.

Upon water being pumped from the tank through the condenser chamber 8, and returned to stand pipe 15 at its higher temperature, due to absorption of heat from the coil, such warm water will be evenly distributed from the perforated headers 19 to the uppermost pan.

Even if not thus equally distributed, the water will automatically find a common level in the continuous annular gutter formed between the outer and inner converging walls, and will be discharged downwardly therefrom by gravity through the continous series of small ports 24. In like manner the next additional pan, and successively those throughout the series clear to the bottom, will receive the water from the next uppermost pan, and will deliver it downwardly to the next lower one, until finally the water is discharged in the form of a spray to the tank.

By reason of the spraying space between each pair of pans, and because of the continuous central open space from top to bottom, there is ample provision for the circulation of atmospheric currents, either upwardly, downwardly, or transversely, and for resulting intimate contact with the numerous sprays.

The result of such action is to effectually reduce the temperature of the water, as is generally understood and practiced in devices of the same general kind.

Due to the sloping arrangement of the outer walls 22 of the pans, their interior is completely protected from undue or excessive air pressure from lateral currents, so that waste of water thereby is entirely avoided, supplemented by the upwardly extending vertical edges 21.

The arrangement also facilitates thorough contact with the sprays by incoming currents of air, which are deflected downwardly by the outer surfaces of the walls 22, thereby ensuring such intimate contact. Similar protection is effected by the shorter inner sloping walls 23.

In Figs. 5 to 8 inclusive, I have shown a modified arrangement and construction in which the series of spray pans 22$^a$ are arranged in a vertical series around the central stand pipe 15$^a$ for establishing a spraying current in the same general manner.

In such construction the central pipe 15$^a$ delivers the water at the upper end through a terminal fitting 17$^a$ and lateral pipes 16$^a$ into oppositely arranged semi-circular open top troughs 19$^a$. These are provided with notches or grooves 20$^a$ through their upper outer and inner edges, through which the water overflows in a generally annular stream and passes downwardly into the interior of the uppermost annular spray pan 22$^a$.

Such pans, in vertical series, are of the same general construction as already described, having the annular series of spray openings 24$^a$ between the outer main sloping wall 22$^a$ and the inner reversely sloping wall 23$^a$. Each such pan is mounted on the central pipe 15$^a$ by a spanner 2$^a$, the hub of each spanner resting on the hub of the next lower spanner, whereby to support the series continuously throughout.

The circulation of the water downwardly through such series of pans, with the intervening air circulation spaces for transverse current and the continuous middle space within the inner sloping walls 23$^a$, is generally similar and with the same result and effect as already described.

The number, size and relative arrangement of the several pans may, of course, be changed or varied by the skilled mechanic, and the invention may be otherwise altered as to detail construction, but all such changes are to be understood as within the scope of the following claims.

What I claim is:

1. In water cooling mechanism of the class described, the combination with a central stand pipe having laterally disposed water distributing headers at its upper end, of a vertical series of spaced superposed spray pans each having a main outer inwardly inclined wall with a V-shaped terminal provided with water circulation spray ports through its bottom, whereby the uppermost of said pans receives water from the distributing headers of the stand pipe and the water is delivered successively through said perforations with alternating air exposure and finally outwardly through the perforations of the bottom pan.

2. In water spray mechanism, a vertical series of water spray pans each having a main inwardly and downwardly sloping continuous side wall with a reversely upturned wall providing an annular channel or gutter and having perforations through the bottom thereof, means for supporting said pans in spaced relation with the outer edge of each lower pan extending upwardly beyond the delivery perforations of the adjacent gutter, and means for distributing water to the uppermost of said pans.

3. In water spray mechanism, a vertical series of water spray pans each having a main inwardly and downwardly sloping continuous side wall with a reversely upturned wall providing an annular channel or gutter and having perforations through the bottom thereof, means for supporting said pans in spaced relation with the outer edge of each lower pan extending upwardly beyond the delivery perforations of the adjacent gutter, means for distributing water to the uppermost of said pans, and a lower collecting reservoir provided with means effecting circulation from the reservoir through a utilizing device and back to the uppermost water distributing mechanism.

4. In water spraying apparatus, a series of uniform water spray pans having main outermost inwardly and downwardly sloping side walls turned inwardly and upwardly at their bottoms providing a comparatively narrow reversed wall and forming a gutter or channel and having therethrough water circulating spray openings with intervening V-shaped transverse terminal air circulation spaces, a skeleton framework connected with and supporting said pans in spaced relationship, means for supplying water to the uppermost of said pans, and means for collecting water delivered through the ports of the lowermost of said pans.

5. The combination with a receiving spray pan having an annular series of transverse spray perforations and a supporting framework therefor, of a centrally arranged stand pipe having laterally disposed discharge headers for delivery into the uppermost spray pan, and supporting devices for said headers connecting them with the framework.

6. The combination with a receiving spray pan having an annular series of transverse spray perforations and a supporting framework therefor, of a centrally arranged stand pipe having laterally disposed discharge headers for delivery into the uppermost spray pan, and supporting devices for said headers connecting them with the framework and provided with means for effecting vertical adjustment of the headers.

In testimony whereof I hereunto affix my signature.

J HARRY LAKIN.